United States Patent [19]
Ohsawa

[11] Patent Number: 5,303,264
[45] Date of Patent: Apr. 12, 1994

[54] ADAPTIVE EQUALIZER USING RECURSIVE LEAST-SQUARES ALGORITHM AND METHOD THEREFOR

[75] Inventor: Tomoki Ohsawa, Tokyo, Japan

[73] Assignee: NEC Corporation, Tokyo, Japan

[21] Appl. No.: 693,183

[22] Filed: Apr. 29, 1991

[30] Foreign Application Priority Data

Apr. 27, 1990 [JP] Japan ................................. 2-114583

[51] Int. Cl.⁵ ............................................. H03H 7/30
[52] U.S. Cl. ........................................ 375/12; 375/14
[58] Field of Search ............... 375/12, 14, 98; 333/18, 333/28 R; 364/424.19, 424.20

[56] References Cited

U.S. PATENT DOCUMENTS 5,058,047 10/1991 Chung ............................. 364/424.19
5,068,873 11/1991 Murakami .......................... 375/13
5,119,401 6/1992 Tsujimoto ........................... 375/14

OTHER PUBLICATIONS

"Adaptive Filters" edited by C. F. N. Cowan and P. M. Grant, Prentice-Hall, Inc., Chapter 3, pp. 29–35.
"Theoretical Analysis on RLS Adaptive Equalizer Performance in Mobile Radio Transmission" written by Hiroshi Suzuki et al, pp. 25–30.
"Performance of a Decision Feedback Equalizer under Frequency Selective Fading in Land Mobile Communications" written by Makito Nakajima et al, pp. 515–523.
"Design of an Adaptive Kalman Equalizer and Its Performance Over Facing Multipath Channels", 1990 IEEE, pp. 564–570.

*Primary Examiner*—Curtis Kuntz
*Assistant Examiner*—T. Ghebretinsae
*Attorney, Agent, or Firm*—Sughrue, Mion, Zinn, Macpeak & Seas

[57] ABSTRACT

Disclosed is a hardware arrangement for equalizing waveform distortion caused by multipath fading in a digital radio communications system, which hardware arrangement uses a recursive least-squares algorithm into which a forgetting factor is introduced. An incoming signal (PSK signal for example) is applied to an automatic gain controller which generates a first signal whose value varies with a signal-to-noise ratio of the incoming signal. A forgetting factor controller is coupled to the automatic gain controller to receive the first signal and generates the forgetting factor the value of which varies with the value of the first signal. An adaptive equalizer receives the incoming signal and the forgetting factor. The adaptive equalizer equalizes the waveform distortion using the forgetting factor according to the recursive least-squares algorithm.

8 Claims, 3 Drawing Sheets

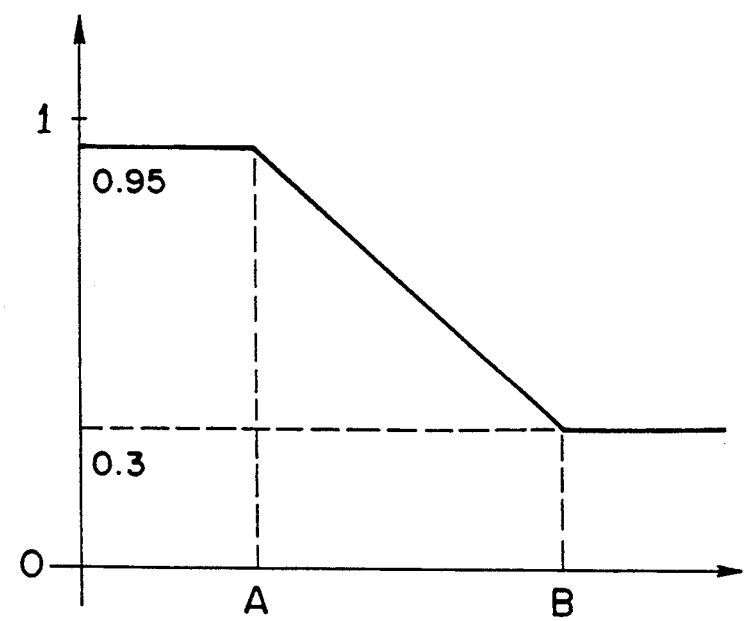

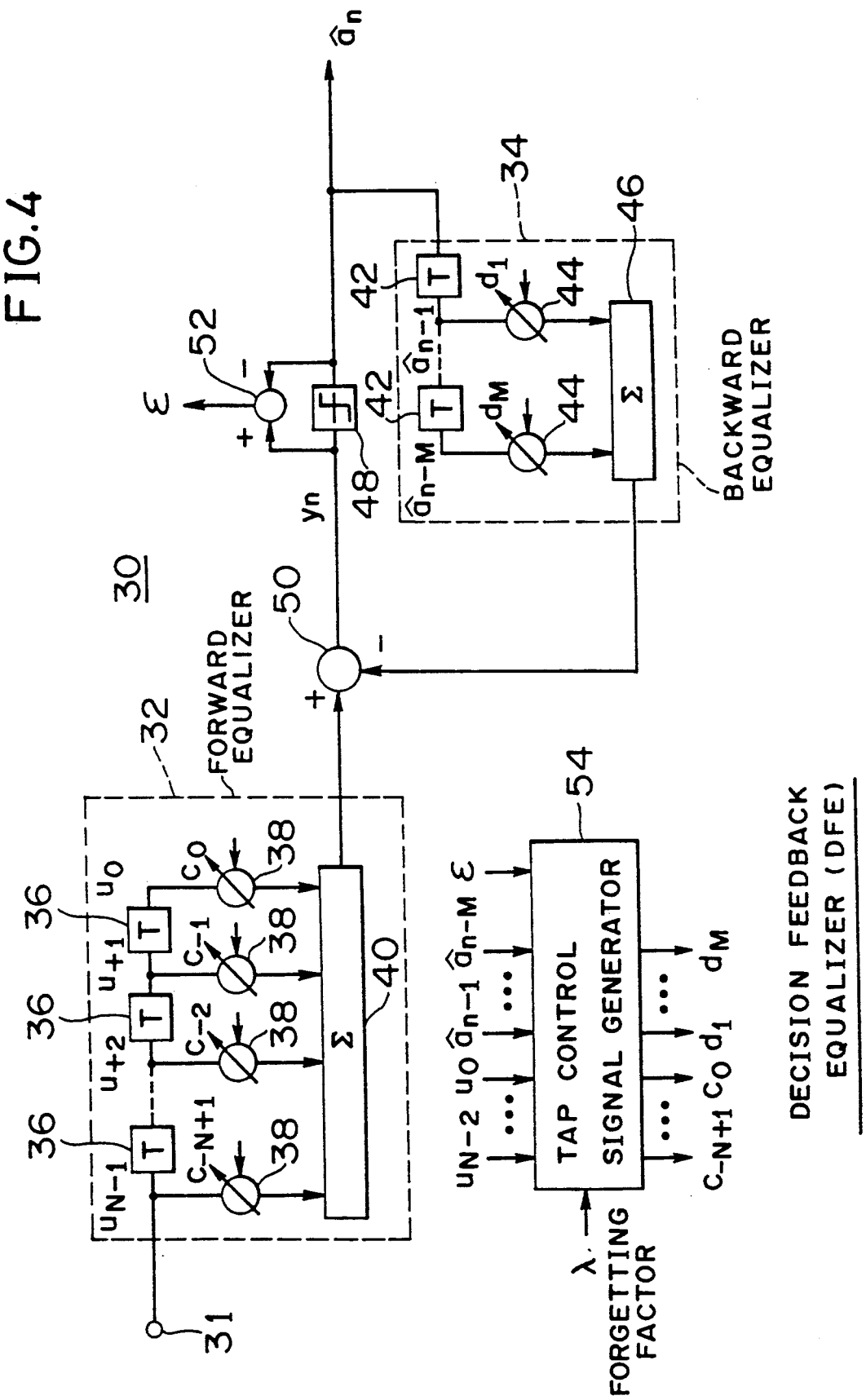

ADAPTIVE EQUALIZER USING RECURSIVE LEAST-SQUARES ALGORITHM AND METHOD THEREFOR

BACKGROUND OF THE INVENTION

1. Field of the Invention

The present invention relates generally to an adaptive equalizer, and more specifically to an adaptive equalizer using a recursive least-squares (RLS) algorithm into which a forgetting factor is introduced. The adaptive equalizer is well suited for equalizing waveform distortion caused by multipath fading in a digital radio communications system. The forgetting factor is a memory factor for exponentially weighted RLS algorithms as is known in the art.

2. Description of the Prior Art

Digital radio transmission is susceptible to multipath fading or the like and invites waveform distortion of signal quality. In order to minimize this problem, the recursive least-squares (RLS) algorithm has gained considerable popularity. The RLS algorithm has been discussed in a book entitled "Adaptive Filters" edited by C. F. N. Cowan and P. M. Grant and published by Prentice-Hall, Inc., Englewood Cliffs, N.J., 1985, pages 29-35, by way of example.

However, the adaptive filter using the RLS algorithm has been found insufficient in rapidly tracking time varying incoming signals. In order to cope with this difficulty, an RLS algorithm using a forgetting factor has been proposed in an article entitled "Theoretical Analysis on RLS Adaptive Equalizer Performance in Mobile Radio Transmission" written by Hiroshi Suzuki, et al. in Technical Report published by Electronics Information & Communications Association (Japan), RSC 89-46, 1989, pages 25-30, or in an article entitled "Performance of a Decision Feedback Equalizer under Frequency Selective Fading in Land Mobile Communications" written by Makito MAKAJIMA, et al. published by the same Japanese Association as mentioned above, Paper B-II, Vol. J72-B-II, No. 10, October, 1989, pages 515-523.

The forgetting factor used in each of the above-mentioned technical papers, has been fixed to a constant value between 0 and 1. As the forgetting factor approaches zero, the fast tracking or converging of quickly time varying incoming signals can be achieved but noise cancellation is lowered. Contrarily, as the forgetting factor approaches 1, noises are effectively cancelled but the tracking of quickly time varying signals speed is lowered. Under the transmission path conditions where a signal-to-noise ratio is high, it is preferred that a forgetting factor is set to a low value for achieving high tracking or convergence of the time varying signals.

However, according to the known techniques, the forgetting factor is set to a fixed high value in the vicinity of 1 (0.95 for example) in order to maintain effective noise cancellation. Accordingly, the fast tracking of the time varying signals is sacrificed even in the presence of a high signal-to-noise ratio.

SUMMARY OF THE INVENTION

It is therefore an object of the present invention to provide an adaptive equalizer and method therefor according to a recursive least-square algorithm using a forgetting factor which varies in accordance with changing of a signal-to-noise ratio.

In brief, the above object is achieved by a hardware arrangement for equalizing waveform distortion caused by multipath fading in a digital radio communications system. The hardware arrangement uses a recursive least-squares algorithm into which a forgetting factor is introduced. An incoming signal (PSK signal for example) is applied to an automatic gain controller which generates a first signal whose value varies with a signal-to-noise ratio of the incoming signal. A forgetting factor controller is coupled to the automatic gain controller to receive the first signal and generates the forgetting factor the value of which varies with the value of the first signal. An adaptive equalizer receives the incoming signal and the forgetting factor. The adaptive equalizer equalizes the waveform distortion using the forgetting factor according to the recursive least-squares algorithm.

More specifically a first aspect of the present invention includes a hardware arrangement for equalizing waveform distortion caused by multipath fading in a digital radio communications system according to a recursive least-squares algorithm using a forgetting factor, including: first means, the first means receiving an incoming signal and generating a first signal whose value varies with a signal-to-noise ratio of the incoming signal; second means, the second means being coupled to the first means to receive the first signal and for generating the forgetting factor the value of which varies with the value of the first signal; and third means, the third means receiving the incoming signal and the forgetting factor, the third means adaptively equalizing the waveform distortion using the forgetting factor according to the recursive least-squares algorithm.

A second aspect of the present invention includes a method of equalizing waveform distortion caused by multipath fading in a digital radio communications system according to a recursive least-squares algorithm using a forgetting factor, including the steps of: (a) receiving an incoming signal and generating a first signal whose value varies with a signal-to-noise ratio of the incoming signal; (b) receiving the first signal and generating the forgetting factor the value of which varies with the value of the first signal; and (c) receiving the incoming signal and the forgetting factor for adaptively equalizing the waveform distortion using the forgetting factor according to the recursive least-squares algorithm.

BRIEF DESCRIPTION OF THE DRAWINGS

The features and advantages of the present invention will become more clearly appreciated from the following description taken in conjunction with the accompanying drawings in which like blocks or circuits are denoted by like reference numerals and in which:

FIG. 3 is a graph showing a forgetting factor versus a signal-to-noise ratio for describing the present invention; and FIG. 4 is a block diagram showing a known adaptive equalizer which forms part of the FIG. 1 arrangement and which takes the form of decision feedback equalizer by way of example.

DETAILED DESCRIPTION OF THE PREFERRED EMBODIMENTS

Figure 1:
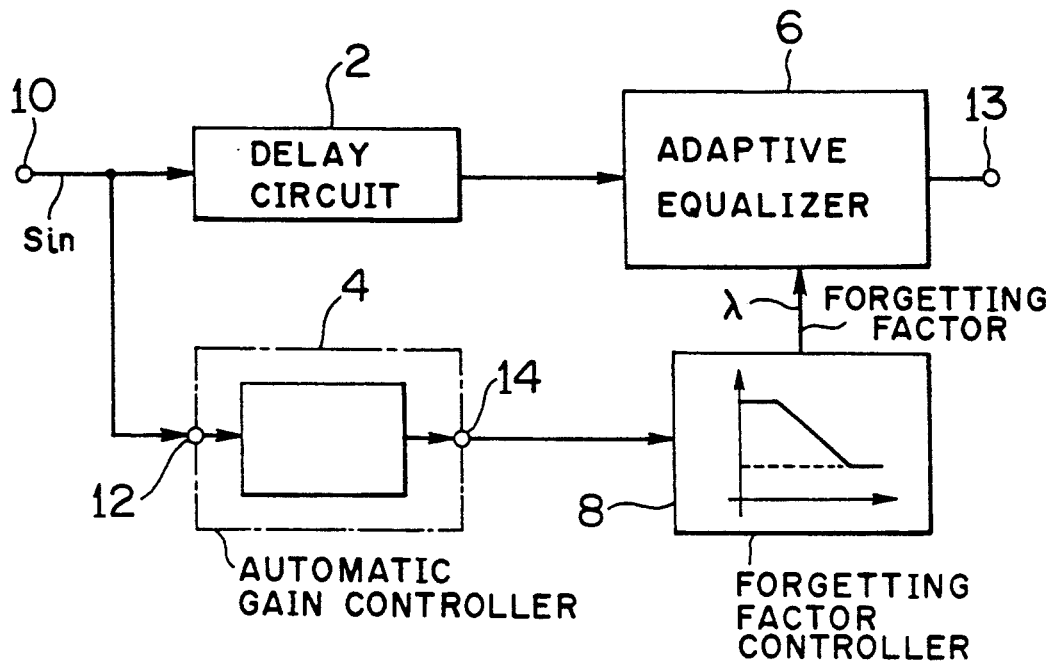
FIG. 1 is a block diagram schematically showing an arrangement according to the present invention.

Reference is now made to FIG. 1, wherein an embodiment of the present invention is schematically illustrated in block diagram form.

The FIG. 1 arrangement includes a delay circuit 2, an automatic gain controller 4, an adaptive equalizer 6 and a forgetting factor controller 8. An incoming signal (PSK (Phase Shift Keying) signal for example), denoted by Sin, is applied to the delay circuit 2 and also to an automatic gain controller 4 via an input terminal 10. More specifically, the controller 4 is supplied with the incoming signal Sin via an input terminal thereof 12 and applies the output thereof to the next stage, viz., the forgetting factor controller 8 via an output terminal 14. The delay circuit 2 is provided to compensate for a time period which is required for signal processing in the automatic gain controller 4. The output of the FIG. 1 arrangement is derived through an output terminal 13.

Figure 2:
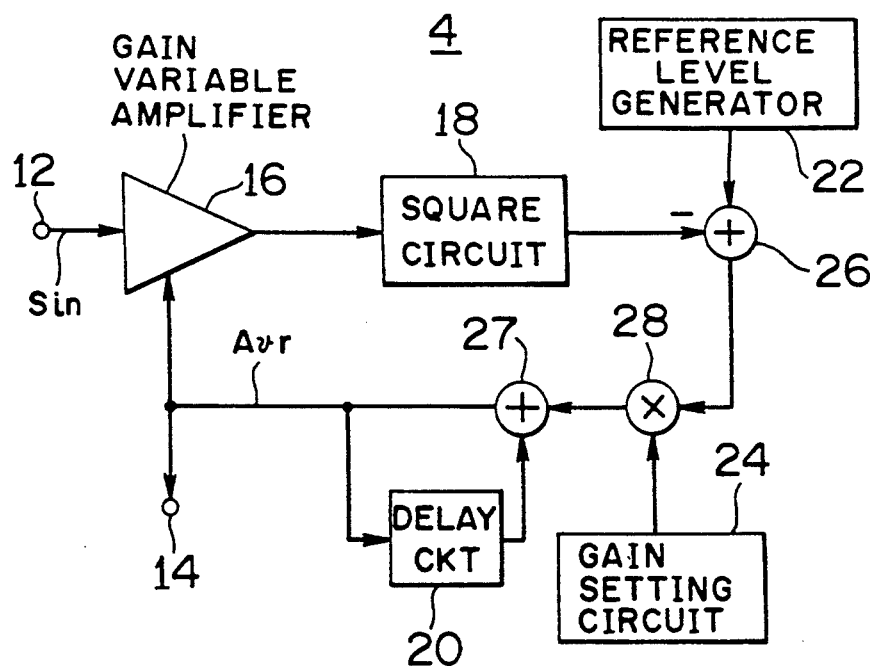
FIG. 2 is a block diagram illustrating in detail a known automatic gain control circuit which forms part of the arrangement shown in FIG. 1.

As shown in FIG. 2, the automatic gain controller 4 includes a gain variable amplifier 16, a square circuit 18, a delay circuit 20, a reference level generator 22, an amplifier gain setting circuit 24, two adders 26, 27, and a multiplier 28, all of which are coupled as shown.

The incoming signal Sin which is applied by way of the input terminals 10 and 12, is amplified at the gain variable amplifier 16 and subsequently supplied to the square circuit 18. The amplification degree of the amplifier 16 is controlled by a gain control signal Avr applied from the adder 27. The output of the amplifier 16 is raised to the second power at the square circuit 18 for obtaining a signal power which is supplied to the adder 26. The adder 26 effectively functions as a subtractor in this particular case. The adder 26 produces a signal which exhibits the difference between the output of the square circuit 18 and a reference level applied from the reference level generator 22. The output of the adder 26 is multiplied, at the multiplier 28, by a previously determined gain which is inputted from the gain setting circuit 24. Following this, the adder 27 combines the output of the multiplier 28 and the output of the delay circuit 20 by addition, and applies the output thereof to the amplifier 16 and to the output terminal 14. The adder 27 and the delay circuit 20 function in combination as an integrator.

The FIG. 2 arrangement is considered to be well known to those skilled in the art and hence further description is deemed unnecessary.

It is understood that when the incoming signal Sin increases, the gain control signal Avr is lowered and vice versa. It should be noted that, in the instant embodiment, a noise power (N) of the incoming signal Sin is considered constant. Accordingly, the variable gain control signal Avr can be deemed to be proportional to a signal-to-noise ratio (S/N).

The output of the automatic gain controller 4, viz., the variable gain control signal Avr, is applied to the forgetting factor controller 8 which takes the form of ROM (Read Only Memory) by way of example. The ROM contains previously recorded data which defines a look-up table from which a forgetting factor specified by the varying signal-to-noise ratio applied thereto, can be determined. An example of the relationship between the forgetting factor and the signal-to-noise ratio is shown in FIG. 3.

In the event that the signal-to-noise ratio is less than a first predetermined value (denoted by "A") and noise cancellation is therefore vital even though some sacrifice in the fast convergence or tracking of quickly time varying signals will occur, the forgetting factor $\lambda$ is modified so that it exhibits a value of 0.95 (for example). On the contrary, in the case where the signal-to-noise ratio rises above a second predetermined value (denoted by "B"), the forgetting factor $\lambda$ is lowered to 0.3 (for example). Under these conditions, fast tracking of quickly time varying signals can be realized by the equalizer 6 although noise cancellation is lowered.

The forgetting factor $\lambda$ is applied to the adaptive equalizer 6 which utilizes the above-mentioned recursive least-squares algorithm. A known example of the equalizer 6 is shown in detail in FIG. 4.

It should be noted that the instant invention is applicable to any adaptive equalizer which makes use of an RLS algorithm using a forgetting factor.

FIG. 4 is a known block diagram showing a non-linear type equalizer which corresponds to the adaptive equalizer 6 (FIG. 1) and to which the present invention is applicable. The FIG. 4 arrangement takes the form of a decision feedback equalizer (DFE) denoted by reference numeral 30. Since the arrangement shown in FIG. 4 is known in the art, merely a simplified description is given in the following.

The DFE 30 shown in FIG. 4 includes a forward equalizer (FE) 32 and a backward equalizer (BE) 34. A center tap $c_0$ of the overall DFE 30 is positioned at the final tap of the forward equalizer as shown. The forward equalizer 30 includes N delay circuits 36 coupled in series, N multipliers 38 and an adder 40. On the other hand, the backward equalizer 34 is provided with M delay circuits 42, M multipliers 44 and an adder 46. Further, the DFE 30 includes a decision circuit 48, two subtractors 50, 52, and a tap control signal generator 54.

The DFE 30 is supplied with the incoming PSK signal (for example) via an input terminal 31 and operates to minimize intersymbol interference (ISI) due to a precursor of an impulse response at the forward equalizer 32, while minimizing ISI caused by a postcursor at the backward equalizer 34. The output of the forward equalizer 32 is subtracted from the output of the backward equalizer 34 at the subtractor 50. A decision signal $\hat{a}_n$ which is outputted from the decision circuit 48 and then fed back to the backward equalizer 34, is free of intersymbol interference and noises.

Merely for the convenience of describing the operations of the FIG. 4 arrangement, a tap coefficient and the tap corresponding thereto are denoted by the same reference numerals.

The subtractor 52 determines the difference between the input and output of the decision circuit 48 and applies the same to the tap control signal generator 54 as an error signal $\epsilon$. The incoming signal Sin is applied to the forward equalizer 32 via the input terminal 31, and are delayed by the delay circuits 36 and distributed on the taps $c_{+1}, c_0, c_{-1}, \ldots, c_{-N+2}$ as $u_{-1}, u_0, u_{+1}, \ldots, u_{N-2}$ in the order of $r_{n-1}, r_n, \ldots, r_{n+N-2}$. The distributed values on the taps are applied to the tap control signal generator 54, further are multiplied by corresponding tap coefficients $c_{+1}, c_0, c_{-1}, \ldots, c_{-N+2}$ at the corresponding multipliers 38. Following this, the multiplied values are summed at the adder 40 and then applied to the subtractor 50.

The subtractor 50 issues a difference, denoted by $y_n$, between the outputs of the two equalizers 32 and 34, and applies the same to the decision circuit 48 which is a non-linear element. The decision circuit 48 generates the decision signal (or discriminating signal) â which is applied to the backward equalizer 34. The decision signal â is delayed by a plurality of the delay circuits 44. The distributed decision signals $â_{n-1}, \ldots, â_{n-M}$ are multiplied by the corresponding tap coefficients $d_1, \ldots, d_M$ at the multipliers 44. The multiplied values are added at the adder 46 whose output is fed back to the subtractor 50, and also are applied to the tap control signal generator 54.

The forgetting factor $\lambda$ is also applied to the tap control signal generator 54. The generator 54 calculates the tap coefficients $c_0, c_{-1}, \ldots, c_{-N+1}, d_1, \ldots,$ and $d_M$ by using a central processing unit (CPU) (not shown). The generation of these tap coefficients using the forgetting factor, etc., is not directly concerned with the present invention. For further details relating the generation of the tap coefficients, reference should be had to the paper entitled "Design of an Adaptive Kalman Equalizer and Its Performance Over Fading Multipath Channels" written by Keishi MURAKAMI, et al., CH2846-4/90/0000-0564, IEEE, 1990.

While the foregoing description describes one embodiment of the present invention and one variant thereof, the various alternatives and modifications possible without departing from the scope of the present invention, which is limited only by the appended claims, will be apparent to those skilled in the art.

What is claimed is:

1. A hardware arrangement for equalizing waveform distortion caused by multipath fading in a digital radio communications system according to a recursive least-squares algorithm using a forgetting factor, including:

first means for receiving an incoming signal and generating a signal which indicates a signal-to-noise ratio of said incoming signal;

second means being coupled to said first means to receive said signal and generating the forgetting factor which varies with said signal-to-noise ratio of said incoming signal; and third means being coupled to receive the incoming signal and the forgetting factor, said third means adaptively equalizing the waveform distortion of the incoming signal using the forgetting factor according to the recursive least-squares algorithm and generating an output which is an output of said hardware arrangement.

2. A hardware arrangement as claimed in claim 1, wherein said first means is an automatic gain controller.

3. A hardware arrangement as claimed in claim 1, wherein said second means is a read-only memory which is provided with a look-up table by which the value of the forgetting factor is determined according to said signal-to-noise ratio of said incoming signal.

4. A hardware arrangement as claimed in claim 1, further comprising a delay circuit which precedes said third means and which delays the incoming signal.

5. A method of equalizing waveform distortion caused by multipath fading in a digital radio communications system according to a recursive least-squares algorithm using a forgetting factor, including the steps of:

(a) receiving an incoming signal and generating a signal which indicates a signal-to-noise ratio of said incoming signal;

(b) receiving said signal and generating the forgetting factor which varies with said signal-to-noise ratio of said incoming signal; and (c) receiving the incoming signal and the forgetting factor and adaptively equalizing the waveform distortion of the incoming signal using the forgetting factor according to the recursive least-squares algorithm.

6. A method as claimed in claim 5, wherein said first signal is generated by using an automatic gain controller.

7. A method as claimed in claim 5, wherein the value of the forgetting factor is determined according to said signal-to-noise ratio of said incoming signal using a look-up table stored in a read-only memory.

8. A method as claimed in claim 5, further including a step of delaying the incoming signal before step (c).

* * * * *